United States Patent Office 3,798,215
Patented Mar. 19, 1974

3,798,215
PROPADIENYL-SUBSTITUTED CARBINOLS
Eugene E. Galantay, Morristown, and Dietmar A. Habeck, Dover, N.J., assignors to Sandoz-Wander Inc., Hanover, N.J.
No Drawing. Continuation-in-part of applications Ser. No. 39,546, May 21, 1970, Ser. No. 71,279, Sept. 10, 1970, and Ser. No. 114,080, Feb. 9, 1971, which is a continuation-in-part of application Ser. No. 778,777, Nov. 25, 1968, now abandoned. This application July 6, 1971, Ser. No. 160,057
The portion of the term of the patent subsequent to Mar. 6, 1990, has been disclaimed
Int. Cl. C07c 169/08
U.S. Cl. 260—239.55 C     22 Claims

ABSTRACT OF THE DISCLOSURE

A process is provided for the preparation of 17β-hydroxy - 17α - propadienyl - substituted compounds of a steroidal nature, said compounds being useful as pharmaceutical agents.

---

This application is a continuation-in-part of copending U.S. patent applications Ser. Nos. 39,546 filed May 21, 1970 (now abandoned) and 71,279 filed Sept. 10, 1970 (now U.S. Pat. 3,719,670) and 114,080 filed Feb. 9, 1971, each of which in turn is a continuation-in-part of then copending U.S. application Ser. No. 778,777, filed Nov. 25, 1968, now abandoned.

This invention relates to the preparation of a class of carbinol compounds, and more particularly, to compounds of a steroidal nature bearing a hydroxy and a propadienyl substituent on the 17β and 17α-positions (or equivalents thereof), respectively.

The process of this invention provides substituted steroidal compounds of the type represented by the following Formula I:

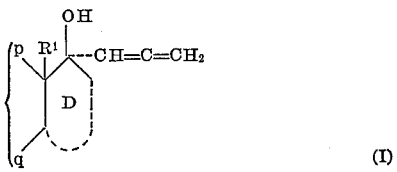

(I)

wherein $R^1$ is alkyl having 1 to 3 carbon atoms, e.g. methyl, ethyl, propyl;

$\widetilde{p\ q}$ is the residue of a steroid compound; and

D is a 5- or 6-numbered ring optionally substituted with a hydroxy radical.

With reference to the conventional numbering for the cyclopentanophenanthrene nucleus, the steroid nucleus may contain from 0 to 5 double bonds (ethylenic unsaturation); preferably in such arrangements at 1,3,5(10); 1, 3,5(10)7; 1,3,5(10),7,8,(9); 4; 4,7; 5(10); 2,5(10); 3,5; or 4,9(10). The carbon atoms of the nucleus may be substituted or unsubstituted, i.e. the nucleus may contain:

(a) Up to 4 substituents selected from the group consisting of lower alkyl or lower cycloalkyl group, particularly at any of positions 1, 6, 7, 8, 9, 10, 11 and 12; the cycloalkyl groups preferably not being located on the same or adjacent carbon atoms;

(b) Not more than 2 substituents selected from the group consisting of lower alkylidene groups, preferably on any of carbon atoms 1, 6, 7, 11 and 12; provided that the carbon atoms are of the secondary type;

(c) Not more than 2 substituents selected from the group consisting of hydroxy, lower alkoxy, cycloalkoxy, tetrahydrofuran - 2 - yloxy, tetrahydropyran - 2 - yloxy, lower (acyloxy) and trimethylsilyloxy; said substituents being located preferably at any of carbon atoms 3- and 11;

(d) Not more than 2 substituents selected from the group consisting of keto, ethylenedioxy, ethanedithio and oximino, preferably at any of carbon atoms 3 and 11, provided that said carbon atoms are secondary;

(e) Not more than two bifunctional substituents, i.e. substituents which connect adjacent carbon atoms or carbon atoms separated by any one additional carbon atoms so as to form a "bridged" structure, such bifunctional substituents including the groups: epoxy, methylene, lower polymethylene, methylenedioxy and dihalomethylene, e.g. difluoromethylene, dichloromethylene and dibromomethylene; or (f) Not more than 2 halo substituents selected from the group consisting of fluoro, chloro and bromo, preferably on any of carbon atoms 6, 7 and 11, when said carbon atoms are ethylenically or aromatically unsaturated or on carbon atoms 8 and 9 when the halogen is fluoro, except where a bridged dihalomethylene is present in which case the nucleus may contain up to 4 halo atoms, including those on the bridged methylene.

In the above-presented definitions, the terms lower alkyl and lower alkoxy, include those groups wherein the alkyl portion has from 1 to 4 carbon atoms such as methyl, ethyl, propyl and butyl including isomeric forms where they exist, but those that are linear are preferred; the terms lower cycloalkyl and cycloalkoxy include those groups having in the cycloalkyl portion from 3 to 7 carbon atoms, such as cyclopropyl, cyclopentyl, cyclohexyl and cycloheptyl; the terms lower acyl includes acyl groups having from 2 to 4 carbon atoms such as acetyl, propionyl and butyryl, and isomeric forms where they exist, but those that are linear are preferred; the term alkylidene includes such groups having from 1 to 4 carbon atoms such as methylene, ethylidene, propylidene, butylidene and isomeric forms where they exist, but are perferably linear; and the term lower polymethylene includes the groups having from 2 to 4 carbon atoms, such as ethylene, trimethylene and tetramethylene.

It is understood that compounds of Formula I in addition to the asymmetrical carbon atoms shown in positions 13 and 17 (or the equivalent thereof), the relative configuration of which is always cis, do contain, also depending on the substituents, additional asymmetric carbon atoms; and therefore optical and geometrical isomers exist which are also represented by Formula I. Thus, just as Compounds I in which the absolute configuration of $C_{13}$ is, as in, say natural β-estradiol are included, so are Compounds I which have the enantiomeric configuration at $C_{13}$. One to one mixtures or co-crystallizate of two enantiomers, called racemates are also included.

The process of this invention, broadly speaking, comprises reducing with a complex hydride a 17β-hydroxy-17α-quaternary aminopropynyl substituted steroid having the formula:

(II)

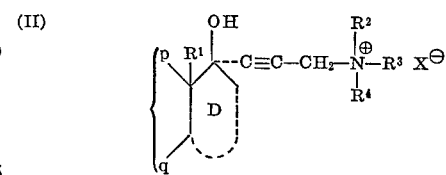

wherein $R^2$ represents lower alkyl, i.e. lower alkyl having 1 to 4 carbon atoms, e.g. methyl, ethyl, propyl or butyl including isomeric forms where they exist although the unbranched chains are preferred and each of $R^3$ and $R^4$ independently represents lower alkyl as defined above; cycloalkyl having 5- or 6-ring carbons, i.e. cyclopentyl or cyclohexyl; or R³ and R⁴ together with N represents a heterocyclic ring having from 5 to 7 members selected from the group consisting of pyrrolidino, piperidino, homopiperidino, morpholino, thiomorpholino, piperazino and N-lower alkyl substituted-piperazino where lower alkyl is as defined above; and X is an anion derived from a mineral acid or an organic sulfonic acid, provided that X is not fluoro.

The reducing agent in the above-mentioned process is a hydride-ion source. A preferred hydride source is a "complex" hydride of the Formula IIIa:

(IIIa)

wherein

Y is an alkali or alkaline earth metal, such as lithium, sodium, potassium, calcium or magnesium, M is a "tervalent" transition metal or non-metal such as aluminum, gallium or boron, i.e. an element or Group IIIa of the Periodic Table having atomic weight of from about 10 to 70; and each of $Z^1$, $Z^2$ and $Z^3$ is, independently, a hydrogen atom, alkyl, lower alkoxy or lower alkoxyalkoxy;

or of the Formula IIIb;

(IIIb)

wherein

M is as defined above and each of $Z^4$ and $Z^5$ is, independently a hydrogen atom or alkyl.

The alkyl, lower alkoxy or lower alkoxyalkoxy moieties of the hydride ion sources (Compounds IIIa or IIIb) have from 1 to 6 carbons, and they include the isomeric forms where they exist. Representative of hydride ion sources are lithium aluminum hydride, lithium borohydride, sodium dihydrobis (2-methoxyethoxy) aluminate, lithium gallium hydride, magnesium aluminum hydride, lithium diisobutylmethyl aluminum hydride, lithium trimethoxy aluminum hydride, diethyl aluminum hydride and diborane. Lithium aluminum hydride or sodium dihydrobis (2-methoxyethoxy) aluminate is preferred.

This process should be carried out in a medium which is not detrimental to the reaction, such as in an aprotic organic solvent, e.g. an ether such as diethyl ether, tetrahydrofuran or dioxane, or an aromatic medium, such as benzene or toluene or pyridine. The use of a solvent which is capable of dissolving a Compound II, the quaternary ammonium intermediate, at the reaction temperature is preferred. The medium may be a mixture or a single material; pyridine being particularly advantageous. The reaction, e.g. may be carried out at from about —40 to +120° C., e.g. at the boiling point of the medium. However, temperatures of from about —10° to +50° C. are preferred. While the higher temperatures result in a faster reaction rate, reactions carried out at lower temperature tend to give purer products. The reaction product (Compound I) may be recovered by conventional means, e.g. by carefully adding a small amount of water or aqueous sodium sulfate to the reaction mixture, filtering off the inorganic by products or hydrolysis products of the hydride ion source, and then separating the Compound I from the organic phase by such means as precipitation, extraction, crystallization, chromatography or liquid-liquid extraction.

As will be appreciated by those skilled in the art, it is preferred to exclude moisture from the reaction, e.g. by use of anhydrous solvents and conditions. The reaction may be advantageously carried out in an inert atmosphere, e.g. under nitrogen gas.

For the preparation of allenes and in particular α-propadienyl carbinols to which class Compounds I belong, several methods have been described in the literature: e.g. "Acetylenes and Allenes," by Th. F. Ruthledge (Reinhold Bock Corp., New York, N.Y. 1969). None of these are adaptable for the preparation of Compounds I in a practical manner either because of the number and complexity of reaction steps involved or because of the inaccessability of starting materials and intermediates or because of the difficulties encountered in "masking" (i.e., rendering unreactive) substituents and double bonds in a Compound I under the reaction conditions. One great shortcoming of said known methods is that they yield a mixture comprising the desired allenes with the undesired acetylenic isomer, separation of which mixture is tedious, impractical and sometimes even impossible.

The process of this invention is unique and surprisingly unexpected in that it gives the desired Compounds I in high purity substantially devoid of acetylenic impurities and in high yields, neighboring 100%. Furthermore, the Compounds II are frequently obtained as crystallizable solids which are particularly convenient to handle and purify.

The inventors present the following description of the possible mechanism of this reaction for the interest of persons skilled in the art, but do not intend their invention to be bound or limited by such description:

(a) The M portion of the complex hydride combines the 17β–OH group of the Compound II forming a covalent or ionic linkage, —OM—, while at the same time;

(b) Delivering a hydride ion to the 1′-carbon atom of the substituent as depicted in the following reaction scheme (only the D ring of the steroid being shown):

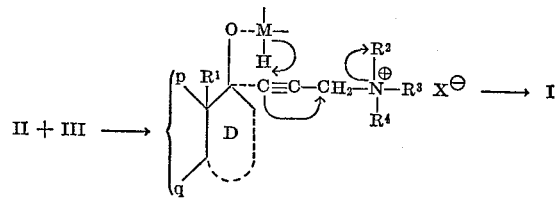

wherein R¹, R², R³ and R⁴, $\widetilde{p \ q}$

M, ring D and X are as defined above; and (c) Subsequently followed by the rearrangement indicated.

It will be obvious to persons skilled in the art that there are reagents and conditions which fulfill the requirements for carrying out the above-depicted mechanism beyond those enumerated above. For example, a Compound II may be used bearing a substituent at the 17β-position which will form the desired —OM moiety, under the reaction conditions, such as a 17β-acyloxy group. Furthermore, while the term "steroidal" is used herein and the cyclopentanophenanthrene nucleus is prepared, it is clear that the process of this invention is also adaptable to the steroids of natural or synthetic configuration, e.g. A-homosteroids, B-homosteroids, C-homosteroids, D-homosteroids, A-nor-steroids, A-nor-B-homosteroids, B-norsteroids, C-norsteroids, azasteroids, especially 8-azasteroids, and the like; and compounds having such nuclei are within the comprehension of this invention. Particularly preferred steroids are 13-alkyl gonanes, such as estranes and androstanes.

The quaternary ammonium salt (Compound II) used in Process (a), may be obtained by quaternizing a suitable 17α- (or equivalent)-(N,N-substituted aminopropynyl)-17β-hydroxy compound of the formula:

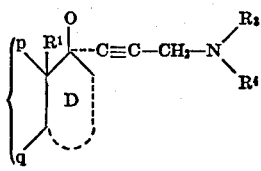

(IV)

with a compound of the formula:

$$R^2-X \quad (V)$$

wherein $R^1$, $R^2$, $R^3$, $R^4$,

ring D and X are as defined above.

The quaternization may be carried out in the conventional manner, e.g. in a suitable solvent, such as acetone, at a temperature of from, e.g. —20° to +30° C. Neither the solvent nor the temperature conditions are critical. The preferred Compound V is methyl iodide.

The (N,N-substituted aminopropynyl) - 17β - hydroxy compounds (Compound IV) may be obtained by known means, e.g. by condensing a corresponding 17α-ethynyl-17β-hydroxy steroid (or equivalent) of the formula:

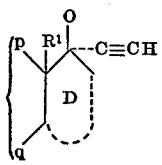

wherein $R^1$,

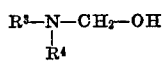

and ring D are as defined above.

with a suitable dialkylamino alcohol, i.e. a Compound VII of the formula:

$$\begin{array}{c} R^3-N-CH_2-OH \\ | \\ R^4 \end{array} \quad (VIIa)$$

wherein $R^3$ and $R^4$ are as defined above; or a mixture of formaldehyde and a compound of the formula:

$$\begin{array}{c} R^3-NH \\ | \\ R^4 \end{array} \quad (VIIb)$$

wherein $R^3$ and $R^4$ are as defined above.

The condensation can be carried out under conditions conventionally employed in carrying out Mannich reactions. Preferably, the process is carried out in the presence of cuprous ions and small amounts of weak acid (e.g. acetic acid), at temperatures of from about 10° to 80° C., preferably from about 40° to 70° C., in an inert organic solvent, such as dioxane or tetrahydrofuran. A preferred source of cuprous ion is cuprous chloride. U.S. Pat. No. 3,184,486 describes the preparation of a Compound IV, by such a procedure.

Alternatively, Compounds IV may be prepared by reacting a suitable 17 (or equivalent)-keto-steroidal compound of the formula:

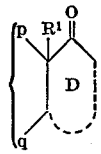

wherein $R^1$,

and ring D are as defined above with a suitable organometallo reagent of the formula:

$$\begin{array}{c} M'-C{\equiv}C-CH_2-N-R^3 \\ | \\ R^4 \end{array} \quad (IX)$$

wherein $R^3$ and $R^4$ are as defined above, and

M' is an equivalent unit of either an active metal, e.g. an alkali metal, such as lithium, potassium or sodium or a polyvalent active metal or metal halide, e.g. aluminum, zinc, magnesium bromide or magnesium iodide to obtain the M' salt of the Compound IV having the formula:

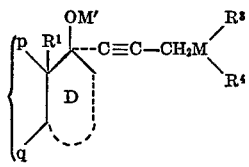

(X)

wherein $R^1$, $R^3$, $R^4$,

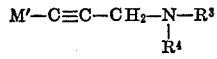

ring D and M' are defined above; which on hydrolysis, yields the desired Compound IV.

This process may be carried out under conditions conveniently employed in carrying out acetylide-ketone type reactions, e.g. in a non-aqueous organic medium at a temperature of from about —30° to 100° C., preferably from about —20° to 50° C., followed by standard hydrolysis of the resulting M' salt (Compound X) in an aqueous medium, e.g. water or a highly concentrated aqueous salt solution, e.g. saturated ammonium chloride solution. The medium used is dependent upon the composition of the organo-metallo reagent. For example, if M' is MgBr, MgI or Li, the medium may be ether or tetrahydrofuran, whereas if M' is Na, the medium may be liquid ammonia-ether, ethylenediamine-tetrahydrofuran, dioxane, pyridine or dioxane-pyridine. Neither the temperature, solvent nor hydrolyzing solution is critical in the process.

It will be readily appreciated that a Compound VI may be obtained from a Compound VIII by known means, e..g. by reacting with an ethynyl group-containing organometallo agent with a corresponding compound of Formula VIII under the conditions described for acetylide-ketone type reactions above.

The above-described starting materials and reactants, e.g. the complex hydrides and Compounds IV, V, VI, VII and IX are either known and may be prepared as described in the literature, or where not known may be prepared by methods analogous to those described in the literature or set out in the examples below.

As will be appreciated by those skilled in the art, various Compounds I may be interconverted by means of known reactions to compounds corresponding to Compounds I, e.g. by acylation, tetrahydropyranylation, quinone oxidation of hydroxy groups, hydrolysis of ketals or enol ethers, quinone dehydrogenation, reduction of ketones or etherification. Such conversions may be employed to advantage when particular substituents would be susceptible to undesired modifications. Similarly, intermediates for the preparation of Compounds I, may be interconverted by employing conventional procedures or by selection of appropriate starting materials to provide Compounds IV which upon treatment as described herein will yield the desired Compounds I. Appropriate reactions to accomplish these objectives are well-known and conventional and are within the skill of persons skilled in the art and described in the literature. For example, it is obvious that a keto group present on a Compound II will be at least partially converted to a hydroxy group during the reduction to Compound I. Hence, formation of keto substituents should be carried out after an appropriate hydroxy-bearing Compound I is obtained, e.g. by quinone oxidation which does not effect the tertiary 17β-hydroxy group. By contrast, subjection of a Compound I to hydrogenation or Birch reduction conditions to reduce a nuclear unsaturated position will likely adversely effect the propadienyl moiety, and therefore such reduction processes aiming at the establishment of the desired nuclear unsaturation should be carried out on an intermediate prior to the preparation of Compounds II and I.

"Masking" or protecting of groups likely to be effected during various of the reactions involved in the preparation of Compounds I may be employed. Likewise, intermediates having "masking" substituents or double bonds which act as "protectors," and ultimately rearranged, may be employed.

Compounds I are useful because they possess pharmacological properties in animals. In particular, such compounds are useful as fertility control agents in animals. The propadienyl group may be viewed as an "activity intensifier," i.e. the presence of such group enhances the type of activity inherent in the known 17α-ethynyl-substituted analogs.

Compounds I having an aromatic ring A, i.e. having 1,3,5(10) unsaturation, possess estrogenic activity as demonstrated by standard tests for estrogenic activity, e.g. in the mouse and rat as determined by the method basically described in Endocrinology 65 (1959) and Am. J. Physiol. 189 (1957) 355, respectively. The Compounds I having no unsaturation or unsaturation other than aromatic unsaturation possess progestational activity as indicated, e.g. by the well known Clauberg test; the method basically described in Endocrinology 63 (1958) 464 wherein the rabbit is given 0.01 to 1.0 milligrams of active agent.

These compounds may be combined with a pharmaceutically carrier or adjuvant. They may be administered orally or parenterally. The dosage will vary depending upon the mode of administration utilized and the particular compound employed. However, in general, satisfactory results are obtained when the compounds are administered at a daily dosage of from 0.05 milligram to 30 milligrams. This daily dosage may be given in a single dose or in equally divided doses, e.g. 1 to 2 tmes a day, or in sustained release form. It will be appreciated by those skilled in the art, that the daily dosage level is independent of body weight. Dosage forms suitable for internal administration comprise from about 0.025 milligram to about 30 milligrams of the compound in admixture with a solid or liquid pharmaceutical carrier or diluent.

Representative formulations suitable for oral administration are tablets or capsules containing the ingredients indicated below which may be prepared by conventional techniques and are useful in controlling fertility at a dose of one tablet or capsule 2 to 4 times a day.

| Ingredient | Weight (mg.) | |
|---|---|---|
| | Tablet | Capsule |
| 17α-propadienylestra-4,9-dien-17β-ol-3-one | 0.05 | 0.05 |
| Tragacanth | 10 | |
| Lactose | 47.45 | 99.95 |
| Corn starch | 25 | |
| Talcum | 15 | |
| Magnesium stearate | 2.5 | |
| Total | 100 | 100 |

EXAMPLE 1

17α-propadienyl-3β-methoxyestra-1,3,5(10)-trien-17β-ol

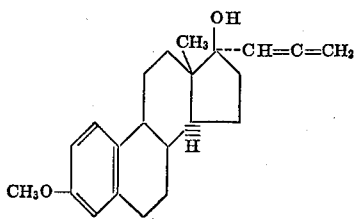

STEP 1

17α-dimethylaminopropynyl-3-methoxyestra-1,3,5(10)-trien-17β-ol

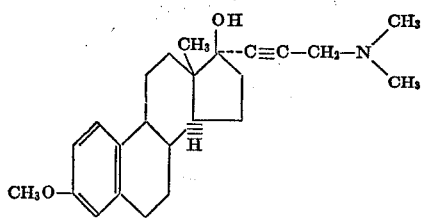

A mixture of 15.8 g. of 17α-ethynyl-3-methoxyestra-1,3,5(10-trien-17β-ol, 15.0 ml. of dimethylaminomethanol, 500 mg. of cuprous chloride, 8.5 ml. of glacial acetic acid and 125 ml. of dioxane is kept at 70° for 5 hours. Then, ice water is added, the pH is adjusted to 10, and the product of this Step 1 extracted with ether. It remains a foam $[\alpha]_D^{20} = -8.84$ (c.=1, CHCl$_3$).

STEP 2

17α-dimethylaminopropynyl-3-methoxyestra-1,3,5(10)-trien-17β-ol methiodide

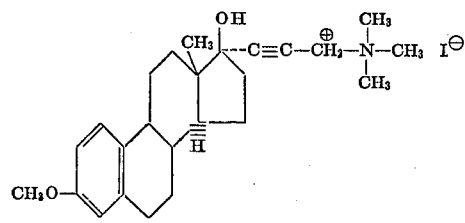

A mixture of 10.0 g. of the dimethylamino product of Step 1, 290 ml. of acetone and 87 ml. of methyl iodide is kept at 0° for 24 hours. The product of this Step 2 separates in crystalline form and is isolated by filtration; M.P. 237–9°.

STEP 3

17α-propadienyl-3-methoxyestra-1,3,5(10)-trien-17β-ol

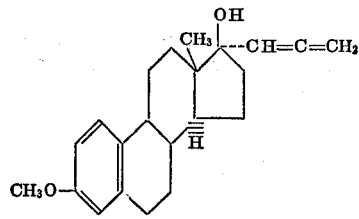

To a suspension of 3.006 g. of the quaternary salt as prepared under Step 2, in 65 ml. of anhydrous tetrahydrofuran, there is added, at −75°, 11.25 ml. of a 0.525 molar lithium-aluminum hydride-tetrahydrofuran solution. The mixture is stirred 2 hours at −10°, during which time a clear solution is obtained; finally, it is kept at room temperature overnight. After re-cooling to 0°, saturated aqueous ammonium chloride solution is added and the title product extracted with ether. A quantitative yield (overall, Steps 1, 2 and 3) of crystalline material, M.P. 129.5–130.5° $[\alpha]_D = +7.18°$ (c.=1, CHCl$_3$) is obtained.

EXAMPLE 2

By using conditions described in Example 1, Steps 1, 2 and 3, respectively and in place of 17α - ethynyl-3-methoxyestra-1,3,5(10)-trien-17β-ol starting with:

(a) 17α-ethynyl-3-methoxyestra-1,3,5(10),7-tetraen-17β-ol
(b) 17α-ethynyl-3-methoxyestra-1,3,5(10),6,8-pentaen-17β-ol
(c) 17α-ethynylestra-4-ene-17β-ol
(d) 3-cyclopentyloxy-17α-ethynylestra-1,3,5(10)-trien-17β-ol
(e) 3-ethoxy-17α-ethynyl-13-ethylgona-1,3,5(10)-trien-17β-ol (f) 17α-ethynyl-3-methoxy-7α-methylestra-1,3,5(10)-trien-17β-ol
(g) 17α-ethynyl-16α-hydroxy-3-methoxyestra-1,3,5(10)-trien-17β-ol or
(h) 17α-ethynylestra-4-ene-3β,17β-diol the following products are obtained:

(a) 17α-propadienyl-3-methoxyestra-1,3,5(10),7-tetraen-17β-ol
(b) 17α-propadienyl-3-methoxyestra-1,3,5(10),6,8-pentaen-17β-ol
(c) 17α-propadienylestra-4-en-17β-ol
(d) 3-cyclopentyloxy-17α-propadienylestra-1,3,5(10)-trien-17β-ol
(e) 3-ethoxy-17α-propadienyl-13-ethylgona-1,3,5(10)-trien-17β-ol
(f) 17α-propadienyl-3-methoxy-7α-methylestra-1,3,5(10)-trien-17β-ol
(g) 17α-propadienyl-16α-hydroxy-3-methoxyestra-1,3,5(10)-trien-17β-ol or
(h) 17α-propadienylestra-4-ene-3β,17β-diol

EXAMPLE 3

17α-propadienyl-3-methoxyestra-2,5(10)-dien-17β-ol

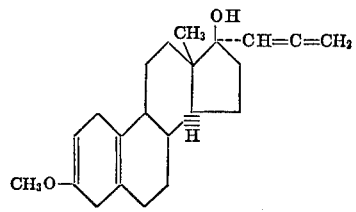

STEP 1

17α-dimethylaminopropynyl-3-methoxyestra-2,5(10)-dien-17β-ol

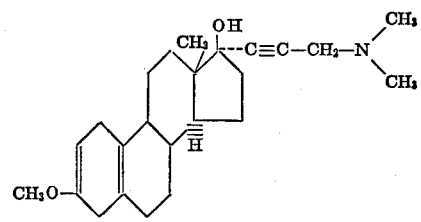

To a Grignard mixture, prepared from 1.50 g. of magnesium, 4.68 g. of ethyl bromide and 70 ml. of tetrahydrofuran, there is dropwise added 5.3 g. of dimethylaminopropyne, dissolved in 10 ml. of tetrahydrofuran. After the evolution of ethane ceases, a solution of 1.716 g. of 3-methoxyestra-2,5(10)-diene-17-one in 30 ml. of tetrahydrofuran is dropwise added, the temperature being 0–5° C. during addition and 20–25° for 4 further hours. Aqueous 2 N NaOH solution (100 ml.) is added and the mixture concentrated in vacuo at temperatures not exceeding 30° C. until the total volume is 100 ml. The concentrated mixture is then extracted with ether (5× 25 ml.), using a centrifuge to facilitate separation from the salt-containing aqueous phase. The product of this Step 1 is obtained by evaporating the dried ethereal solutions and pumping off any excess dimethylaminopropyne present.

STEP 2

17α-dimethylaminopropynyl-3-methoxyestra-2,5(10)-dien-17β-ol methiodide

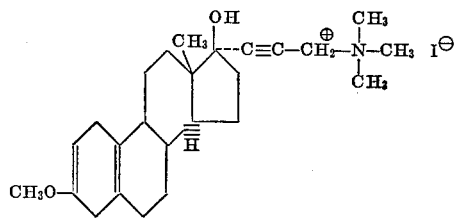

The product of Step 1 (2.0 g.) is dissolved in 30 ml. of acetone. After addition of 3.5 g. of methyl iodide, the mixture is kept at 8° for 18 hours. The title product of this Step 2 crystallizes and is isolated by filtration and washing with anhydrous ether.

STEP 3

17α-propadienyl-3-methoxyestra-2,5(10)-dien-17β-ol

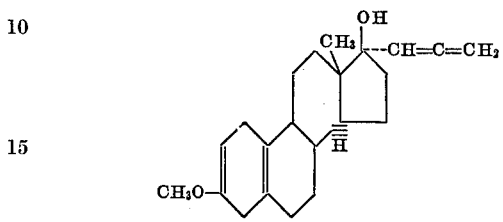

To a suspension of 2.500 g. of the methodide of Step 2, in 50 ml. of tetrahydrofuran, there is added, at −75°, 9.3 ml. of a 0.525 molar lithium aluminum hydride-tetrahydrofuran solution. The mixture is brought to −10° where it is stirred until (90 minutes) a clear solution is obtained. Finally, it is kept at room temperature for 12 hours. 100 ml. of 2 N aqueous NaOH solution containing 50 mg. di-tert.-butylcresol is added and the mixture concentrated in vacuo until the total volume is 100 ml. Extraction with 5×20 ml. ether on the centrifuge, drying the ethereal solutions over $K_2CO_3$ and evaporation gives the title product, 17α-propadienyl-3-methoxyestra-2,5(10)-dien-17β-ol.

EXAMPLE 4

17α-propadienylestra-5(10)-en-17β-ol-3-one

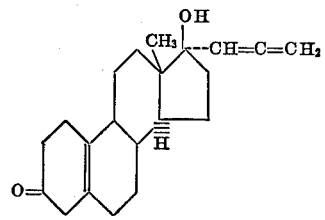

The product of Example 3, 17α-propadienyl-3-methoxyestra-2,5(10)-dien-17β-ol (2.0 g.) is dissolved in a mixture of 20 ml. of glacial acetic acid and 2 ml. of water. After 2 hours, 200 ml. of water is added and the product extracted with ethyl acetate (5×10 ml.). Evaporation of the ethyl acetate extracts gives the title product 17α-propadienylestra-5(10)-en-17β-ol-3-one as a crystalline solid.

EXAMPLE 5

17α-propadienylestra-4-en-17β-ol-3-one

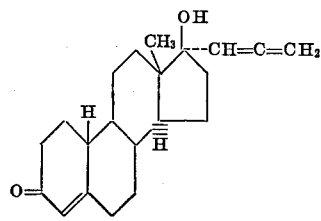

The product of Example 3, 17α-propadienyl-3-methoxyestra-2,5(10)-dien-17β-ol (5.5 g.) is dissolved in a mixture of 50 ml. of methanol and 1.5 ml. of 11 N aqueous hydrochloric acid and is kept at 30° C. for 30 minutes. After dilution with 100 ml. of water, the product is extracted with methylene chloride (5×15 ml.). Evaporation of the dried methylene chloride solutions, followed by recrystallization of the residue from methanol yields the pure compound, 17α-propadienylestra-4-en-17β-ol-3-one.

EXAMPLE 6

By using conditions of Example 3, Steps 1, 2 and 3, and Example 5, respectively and in place of 3-methoxy-estra-2,5(10)-diene-17-one starting with:

(a) Estrone 3-tetrahydropyranyl ether
(b) 3-methoxy-7α-methylestra-2,5(10)-dien-17-one
(c) 3-ethylenedioxy-6α-methylandrost-4-en-17-one
(d) 3,3-dimethoxyestra-5(10)-en-17-one
(e) 3-ethylenedioxy-6-fluoroandrosta-4,6-diene-17-one
(f) 3-ethylenedioxy-6-chlorandrosta-4,6-diene-17-one
(g) 3-ethylenedioxy-6-methylandrosta-4,6-diene-17-one
(h) 3-methoxy-13-ethylgona-2,5(10)-dien-17-one
(i) 13-n-propyl-3β-tetrahydropyranyloxygona-2,5(10)-dien-17-one the following products are obtained:

(a) 17β-propadienylestra-1,3,5(10)-trien-3,17β-diol
(b) 7α-methyl-17α-propadienylestra-4-en-17β-ol-3-one
(c) 6α-methyl-17α-propadienylandrost-4-en-17β-ol-3-one
(d) 17α-propadienylestra-4-en-17β-ol-3-one
(e) 6-fluoro-17α-propadienylandrosta-4,6-dien-17β-ol-3-one
(f) 6-chloro-17α-propadienylandrosta-4,6-dien-17β-ol-3-one
(g) 6-methyl-17α-propadienylandrosta-4,6-dien-17β-ol-3-one
(h) 13-ethyl-17α-propadienylgona-4-en-17β-ol-3-one
(i) 17α-propadienyl-13-n-propylgona-4-en-17β-ol-3-one

EXAMPLE 7

By using conditions of Example 3, Steps 1, 2, 3 and Example 4, respectively, and in place of 3-methoxyestra-2,5(10)-diene-17-one using:

(a) 3-methoxy-7α-methylestra-2,5(10)-dien-17-one
(b) 3-methoxy-13-ethylgona-2,5(10)-dien-17-one the following products are obtained:

(a) 7α-methyl-17α-propadienylestra-5(10)-en-17β-ol-3-one
(b) 13-ethyl-17α-propadienylgona-5(10)-en-17β-ol-3-one

EXAMPLE 8

17β-acetoxy-3-methoxy-17α-propadienylestra-1,3,5(10)-triene

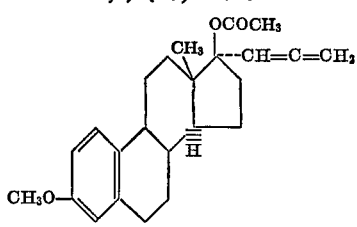

A solution of 297.8 mg. of 17α-propadienyl-3-methoxy-estra-1,3,5(10)-trien-17β-ol (Example 1, Step 3) and 12 mg. of p-toluenesulfonic acid in 6 ml. of isopropenyl acetate is kept at room temperature for 18 hours. Ether is added and the solution, after washing with ice cold NaHCO₃ solution and drying over MgSO₄, is evaporated to dryness to yield, after crystallization from methanol, the title product 17β-acetoxy-3-methoxy-17α-propadienyl-estra-1,3,5(10)-triene, M.P. 89°–90° C., [α]_D = +9.27° (c.=1, CHCl₃).

EXAMPLE 9

By using the conditions of Example 8, and in place of 3 - methoxy - 17α - propadienyl - estra - 1,3,5(10) - triene-17β-ol, starting with:

(a) 17α-propadienylestra-1,3,5(10)-trien-3,17β-diol
(b) 13-n-propyl-17α-propadienylgona-4-ene-3β,17β-diol the following products are obtained:

(a) 3,17β-diacetoxy-17α-propadienylestra-1,3,5(10)-triene
(b) 3β,17β-diacetoxy-17α-propadienyl-13-n-propylgona-4-ene.

EXAMPLE 10

3,17β-dimethoxy-17α-propadienylestra-1,3,5(10)-triene

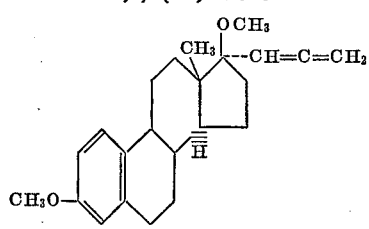

To a solution of lithium amide in liquid ammonia (prepared from 73.5 mg. Li and 26 ml. of NH₃) there is added a solution of 3.24 g. of 17α-propadienyl-3-methoxy-estra-1,3,5(10)-trien-17β-ol (Example 1) in 50 ml. of ether. After 2 hours at refluxing ammonia temperature, 2.5 g. of methyl iodide is added and the ammonia allowed to escape. Addition of 50 ml. of water and separation of the ether phase (and ether washup) followed by the evaporation of the dried ethereal solutions yields the title compound, 3,17β-dimethoxy - 17α - propadienylestra-1,3,5(10)-triene.

EXAMPLE 11

Utilizing the conditions as described in Examples 10 and 5, respectively, and in place of the 17α-propadienyl-3-methoxyestra-1,3,5(10)-trien-17β-ol used therein, starting with:

(a) 3-methoxy-17α-propadienylestra-2,5(10)-dien-17β-ol
(b) 13-ethyl-3-methoxy-17α-propadienylgona-2,5(10)-dien-17β-ol
(c) 3-methoxy-7α-methyl-17α-propadienylestra-2,5(10)-dien-17β-ol the following products are obtained:

(a) 17β-methoxy-17α-propadienylestra-4-en-3-one
(b) 13-ethyl-17β-methoxy-17α-propadienylgona-4-en-3-one
(c) 17β-methoxy-7α-methyl-17α-propadienylestra-4-en-3-one

EXAMPLE 12

3β,17β-diacetoxy-17α-propadienylestra-4-ene

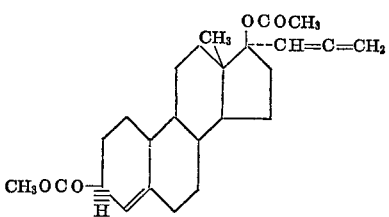

By using the conditions of Example 8 but starting with 17α-propadienylestra-4-ene-3β,17β-diol, the title product, 3β,17β-diacetoxy-17α-propadienylestra-4-ene is obtained.

EXAMPLE 13

3β-acetoxy-17α-propadienylestra-4-en-17β-ol 0.8 g. of 17α-propadienylestra-4-ene-3β,17β-diol (product of Example 2h) is added to a solution of 4.4 ml. of acetic anhydride in 13.0 ml. of pyridine and the resulting mixture stirred at room temperature (20°) for 17 hours, after which period the mixture is poured into 100 ml. of water and extracted 5 times with 10 ml. portions of methylene chloride. The combined methylene chloride extracts are dried over anhydrous sodium sulfate and the solvent removed by evaporation under vacuum to obtain a residue, which upon recrystallization from 95% ethanol yields the title product; M.P. 107 to 108.5°.

EXAMPLE 14

17β-acetoacetoxy-17α-propadienylestra-4-en-3-one

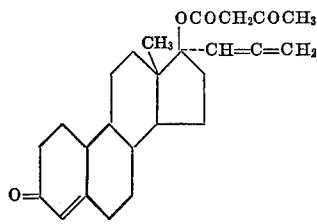

To a solution of 1.0 g. of 17α-propadienylestra-4-en-17β-ol-3-one in a mixture of 18.5 ml. of benzene, 9.25 ml. of toluene and 0.23 ml. of pyridine, there is dropwise added, at 0°, 1.8 ml. of di-ketone, dissolved in 9 ml. of benzene. The mixture is then kept at 25° for 3 hours. The product is isolated by washing the mixture with ice-cold 0.1 N sodium hydroxide and water, drying over anhydrous sodium sulfate and evaporating to dryness to obtain the title product.

EXAMPLE 15

3β - acetoxy - 17β - acetoacetoxy - 17α-propadienyl-4-estrene may be similarly prepared (analogously to Example 14) from 3β - acetoxy - 17α - propadienylestra-4-en-17β-ol; M.P. 110°–112° (from methanol).

EXAMPLE 16

17β-actoxy-17α-propadienylestra-4-en-3-one

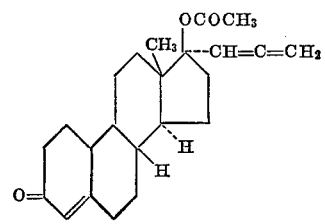

A mixture of 0.050 g. of calcium hydride in 5 ml. of acetic anhydride is refluxed for 1 hour then 0.5 g. of 17α-propadienylestra-4-en-17β-ol-3-one is added and refluxing continued for 3 more hours. After cooling, the mixture is poured on ice and extracted with methylene chloride. The methylene chloride solution is washed with aqueous saturated sodium bicarbonate and then water, dried over anhydrous sodium sulfate and evaporated to give the title product.

EXAMPLE 17

3-cyclopentyloxy-17α-propadienylestra-3,5-dien-17β-ol

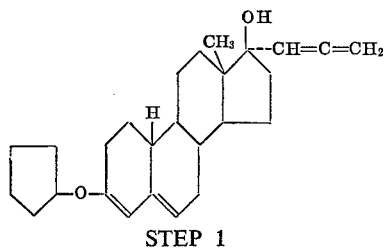

STEP 1

Preparation of 3-cyclopentyloxy-17α-dimethylamino-propynylestra-3,5-dien-17β-ol

To a Grignard mixture, prepared from 1.50 g. of magnesium, 4.68 g. of ethyl bromide and 70 ml. of tetrahydrofuran, there is dropwise added 5.3 g. of dimethylaminopropyne, dissolved in 10 ml. of tetrahydrofuran. After the evolution of ethane ceases, a solution of 1.716 g. of 3-cyclopentyloxyestra-3,5-dien-17-one in 30 ml. of tetrahydrofuran is dropwise added, the temperature being 0–5° C. during the addition and 20–25° for 4 further hours. Aqueous 2 N NaOH solution (100 ml.) is added and the mixture concentrated in vacuo at temperatures not exceeding 30° C. until the total volume is 100 ml. The concentrated mixture is then extracted with ether (5× 25 ml.), using a centrifuge to facilitate separation from the salt-containing aqueous phase. The product of this Step 1 is obtained by evaporating the dried ethereal solutions and pumping off any excess dimethylaminopropyne present.

STEP 2

Preparation of 3-cyclopentyloxy-17α-dimethylamino-propynylestra-3,5-dien-17β-ol methiodide The product of Step 1 (2.0 g.) is dissolved in 30 ml. of acetone. After addition of 3.5 g. of methyl iodide, the mixture is kept at 8° for 18 hours. The methiodide product of this Step 2 crystallizes and is isolated by filtration and washing with anhydrous ether.

STEP 3

Preparation of 3-cyclopentyloxy-17α-propadienyl-estra-3,5-dien-17β-ol

To a suspension of 2.500 g. of methiodide of Step 2, in 50 ml. of tetrahydrofuran, there is added, at −75°, 9.3 ml. of a 0.525 molar lithium aluminum hydride-tetrahydrofuran solution. The mixture is brought to −10° where it is stirred until (90 minutes) a clear solution is obtained. Finally it is kept at room temperature for 12 hours. 100 ml. of 2 N aqueous NaOH solution containing 50 mg. di-tert.-butylcresol is added and the mixture concentrated in vacuo until the total volume is 100 ml. Extraction with 5× 20 ml. ether on the centrifuge, drying the ethereal solutions over $K_2CO_3$ and evaporation gives the title product 3-cyclopentyloxy-17α-propadienylestra-3,5-dien-17β-ol.

Following the procedure described in Steps 1, 2 and 3 of Example 17, but replacing the starting material, i.e., the compound 3-cyclopentyloxyestra-3,5-dien-17-one with an equivalent amount of compound listed in Column A of Table 1 below, there is obtained the final product listed in Column B:

TABLE 1

| (A) Starting material | (B) Final product |
|---|---|
| (a) 3-cyclopentyloxy-13-ethylgona-3,5-dien-17-one. | (a) 3-cyclopentyloxy-13-ethyl-17α-propadienylgona-3,5-dien-17β-ol. |
| (b) 3-cyclohexyloxy-13-ethylgona-3,5-dien-17-one. | (b) 3-cyclohexyloxy-13-ethyl-17α-propadienylgona-3,5-dien-17β-ol. |
| (c) 3-cyclopentyloxy-6-methylestra-3,5-dien-17-one. | (c) 3-cyclopentyloxy-6-methyl-17α-propadienylestra-3,5-dien-17β-ol. |

EXAMPLE 18

3-cyclopentyl-17β-methoxy-17α-propadienylestra-3,5-diene

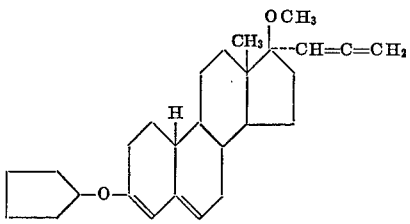

To a solution of sodium amide, prepared from 230 mg. of sodium in 20 ml. of liquid ammonia at −40° a solution of 3-cyclopentyloxy-17α-propadienylestra-3,5-dien-17β-ol (386 mg.) in 5 ml. of anhydrous tetrahydrofuran is added dropwise with stirring. After being stirred at −40° for 40 minutes; 82 ml. of methyl iodide is added and stirring is continued at −40° for 3 hours. The ammonia is then allowed to escape and the reaction mixture allowed to warm to room temperature. Water is added and the crude title product is recovered by ether extraction, chromatographed through basic alumina (grade 2–3) using benzene as the eluant and finally crystallized from methanol containing a trace of pyridine and water.

Following the procedure of this example, but replacing the 3-cyclopentyloxy-17α-propadienylestra - 3,5 - dien-17β-ol used therein, with an equivalent amount of 3-cyclohexyloxy-13-ethyl - 17α - propadienylgona-3,5-dien-17β-ol, and also replacing the methyl iodide used therein with an equivalent amount of ethyl iodide there is obtained 3-cyclohexyloxy-13-ethyl-17β-ethoxy - 17α - propadienyl-gona-3,5-diene.

EXAMPLE 19

3-cyclopentyloxy-17α-propadienylestra-3,5-dien-17β-ol

Step 3 of Example 17 is repeated but in place of the lithium aluminum hydride-tetrahydrofuran used therein, an equivalent amount of each of the following reagents is used to obtain the title product:

lithium—diisobutylmethyl aluminum hydride in diglyme;
lithium—gallium hydride;
lithium—borohydride in tetrahydrofuran;
lithium—tri-t-butoxy aluminum hydride;
lithium—triethyl aluminum hydride;
lithium—trimethoxy aluminum hydride;
diborane—tetrahydrofuran;
lithium—aluminum hydride in pyridine; or
lithium—diethoxy aluminum hydride.

Repeating Step 3 of Example 17, but the 3-cyclopentoxy-17α-dimethylaminopropynylestra - 3,5 - dien-17β-ol methiodide used therein, is replaced by an equivalent amount of the compound of Column A below, to obtain the corresponding product of Column B below:

(A) Quaternary ammonium compounds (1) 17α-dimethylaminopropynyl-6-methylene-4-estren-3β,17β-diol methiodide
(2) 17α-diethylaminopropynyl-7-ethylidene-13-ethyl-4-gonen-3β,17β-diol ethyl-methanesulfonate
(3) 17α-dimethylaminopropynyl-5-(10α,9β)-androsten-3β,17β-diol methiodide
(4) 17α-ethylpropylaminopropynyl-3-ethylenedioxy-1(10),5-estradien-17β-ol methyl-p-toluenesulfonate
(5) 17α-dimethylaminopropynyl-11α,12α-methano-3-tetrahydropyranyloxyestra-1,3,5(10),6,8-pentaen-17β-ol methiodide
(6) 17α-dimethylaminopropynyl-3-ethanedithio-1α,2α-methano-androstan-17β-ol methiodide
(7) 17α-dimethylaminopropynyl-10β,11β-methanol-5-estren-3β,11α,17β-triol methiodide
(8) 17α-dimethylaminopropynyl-13-ethyl-3-ethylenedioxy-5β,10β-methanogonan-17β-ol methiodide (B) The corresponding products (1) 6-methylene-17α-propadienyl-4-estren-3β,17β-diol
(2) 7-ethylidene-13-ethyl-17α-propadienyl-4-gonene-3β,17β-diol
(3) 17α-propadienyl-5-(10α,9β)-androsten-3β,17β-diol, alternate name 17α-propadienyl-5-"retroandrosten"-3β,17β-diol
(4) 3-ethylenedioxy-17α-propadienyl-1(10),5-estradien-17β-ol
(5) 11α,12α-methano-17α-propadienyl-3-tetrahydropyranyloxy estra-1,3,5(10),6,8-pentaen-17β-ol
(6) 3-ethanedithio-1α,2α-methano-17α-propadienyl-androstan-17β-ol
(7) 10β,11β-methano-17α-propadienyl-5-estren-3β,11α,17β-triol
(8) 13-ethyl-3-ethylenedioxy-17α-propadienyl-5β,10β-methanogonan-17β-ol.

EXAMPLE 20

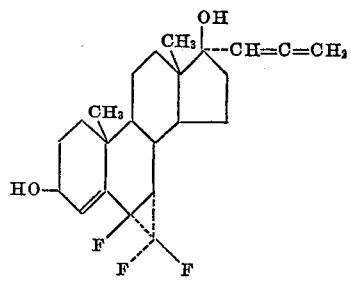

6α,7α-difluoromethano-6β-fluoro-17α-propadienyl-4-androsten-3β,17β-diol

A suspension of 300 mg. of 6α,7α-difluoromethano-6β-fluoro - 17α-N-piperidinopropynyl-4-androsten-3β,17β-diol methiodide in 6 ml. of tetrahydrofuran is treated with 200 mg. of sodium dihydrobis-(2-methoxyethoxy)-aluminate in 3 ml. of benzene at room temperature. Stirring is maintained for 24 hours, then a solution of 300 mg. of sodium sulfate in 5 ml. of 2 N sodium hydroxide is dropwise added, the mixture filtered, the filtrate diluted with 20 ml. of ether, washed with water, dried and evaporated to dryness to yield the title compound.

EXAMPLE 21

3-methoxy-17α-(propa-1′,2′-dienyl)estra-1,3,5(10)-trien-11β,17β-diol

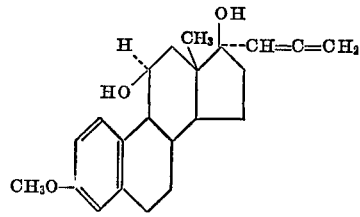

STEP A

Preparation of 3-methoxy-17α-ethynylestra-1,3,5(10)-trien-11β,17β-diol

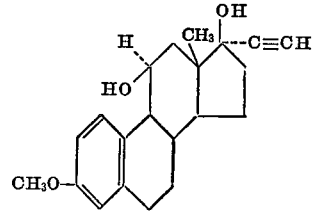

To a mixture of 10 g. of lithium acetylide-ethylene-diamine complex in 80 ml. of dimethylsulfoxide is added at room temperature a solution of 5 g. of 11β-hydroxyestrone methyl ether in 100 ml. of dimethylsulfoxide. The reaction mixture is stirred at room temperature for 2 hours after which time a further 3 g. of the lithium acetylide reagent is added. The stirring is continued for 2 hours more and then the mixture is poured onto 1.5 liters of ice water. Sufficient 2 N HCl solution is added to make the mixture neutral and the precipitated brown solid is collected by filtration and dried under vacuum at 60° C. The dry solid is dissolved in acetone and the solution is decolorized by brief treatment with charcoal. After filtration, sufficient hexane is added to the acetone solution to cause crystallization and there is obtained 3-methoxy-17α-ethynylestra - 1,3,5(10) - trien - 11β,17β-diol, M.P. 178°–179°.

17
STEP B

Preparation of 3-methoxy-17α-(N,N-dimethylamino-propynyl)estra-1,3,5(10)-trien-11β,17β-diol

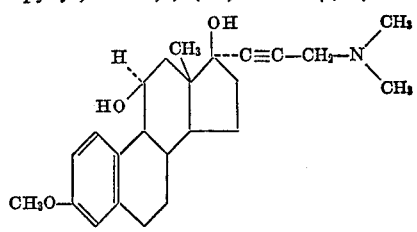

To a solution of 3 g. of 3-methoxy-17α-ethynylestra-1,3,5(10) - trien - 11β,17β-diol (prepared as described in Step A, above) in 25 ml. of dioxane containing 1.7 ml. of glacial acetic acid is added 3 ml. of N,N-dimethylamino methanol and 100 mg. of cuprous chloride. The stirred reaction mixture is then maintained at a temperature of 60 to 70° for 1½ hours after which time the solvents are removed under reduced pressure and the residue is distributed between equal volumes of ether and water containing sufficient sodium hydroxide to maintain it in a basic condition. The aqueous phase is extracted twice more with ether and the combined ether solutions are washed with water and dried. The ether is then removed under vacuum to obtain 3-methoxy-17α-(N,N-dimethylamino-propynyl)estra - 1,3,5(10-trien-11β,17β-diol as a crude foam.

STEP C

Preparation of N,N,N - trimethyl - N-[3'-{1'-(3-methoxy-17α-estra-1,3,5(10)-trien - 11β,17β-diol)}propynyl] ammonium iodide To a solution of 3 g. of crude 3-methoxy-17α-(N,N-dimethylaminopropynyl)estra - 1,3,5(10) - trien-11β,17β-diol (prepared as described in Step B, above) in 30 ml. of acetone is added 20 ml. of methyl iodide. The solution is kept at a temperature of 5° for 18 hours and then the solvents are removed under vacuum. The residue is crystallized from acetone to yield the iodide product, M.P. 180° (with decomposition).

STEP D

Preparation of 3-methoxy-17α-(propa-1'2'-dienyl)estra-1,3,5(10)-trien-11β,17β-diol To a suspension of 2.76 g. of N,N,N-trimethyl-N-[3'-{1'-(3-methoxy-17α-estra - 1,3,5(10)-trien-11β,17β-diol)} propynyl]ammonium iodide (prepared as described in Step C, above) in 20 ml. of anhydrous tetrahydrofuran under ice cooling is added, in 4 portions, a solution of 455 mg. of lithium aluminum hydride in 40 ml. of tetrahydrofuran. After stirring for a further 1½ hours, by which time solution is complete, 5 ml. of water is cautiously added and the solution is adjusted to neutrality by the addition of a 2 N solution of HCl. The tetrahydrofuran is then removed, under vacuum, and the aqueous residue is extracted twice with methylene chloride. The combined organic solutions are dried (over anhydrous sodium sulfate) and then concentrated to a volume of approximately 5–10 ml. This concentrate is then diluted with approximately 5 times its volume of ether when crystallization occurs to yield 3-methoxy-17α-(propa-1',2'-dienyl)estra-1,3, 5(10)-trien-11β,17β-diol, M.P. 155°–156°.

EXAMPLE 22

3-cyclopentyloxy-17α-propadienylestra-3,5-dien-17β-ol

Following the procedure described in Step 3 of Example 17 replacing the tetrahydrofuran used therein as the suspending medium for the quaternary salt, with an equal volume of anhydrous pyridine, the title compound is obtained.

EXAMPLE 23

17α-propadienylestra-4,9-dien-17β-ol-3-one

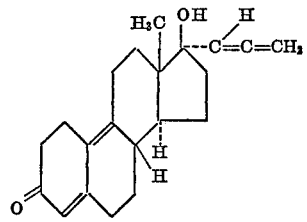

STEP 1

17α-dimethylaminopropynyl-3-ethylenedioxyestra-5(10),9(11)-dien-17β-ol

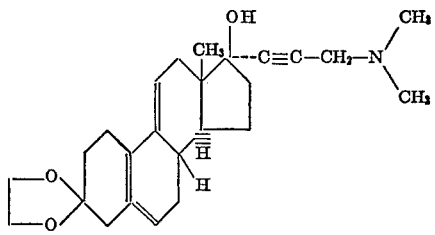

To a Grignard mixture, prepared from 1.50 g. of magnesium, 4.68 g. of ethyl bromide and 70 ml. of tetrahydrofuran, there is dropwise added 5.3 g. of dimethylaminopropyne, dissolved in 10 ml. of tetrahydrofuran. After the evolution of ethane ceases, a solution of 1.888 g. of 3-ethylenedioxyestra-5(10),9(11)-dien-17-one in 30 ml. of tetrahydrofuran is dropwise added, the temperature being maintained at 0–5° C. during the addition and 20–25° for 4 further hours. Aqueous 2 N NaOH solution (100 ml.) is added and the mixture concentrated in vacuo at temperatures not exceeding 30° C. until the total volume is 100 ml. The concentrated mixture is then extracted with ether (5×25 ml.), using a centrifuge to facilitate separation from the salt-containing aqueous phase. The product of this Step 1 is obtained by evaporating the dried ethereal solutions and pumping off any excess dimethylaminopropyne present.

STEP 2

17α-dimethylaminopropynyl-3-ethylenedioxyestra-5(10), 9(11)-dien-17β-ol methiodide 2 g. of 17α-dimethylaminopynyl-3-ethylenedioxyestra-5 (10, 9(11)-dien-17β-ol (product of Step 1) is dissolved in 30 ml. of acetone. After addition of 3.2 g. of methyl iodide, the mixture is kept at 8° for 18 hours. The title product of this Step 2 crystallizes and is isolated by filtration and washing with anhydrous ether.

STEP 3

3-ethylenedioxy-17α-propadienylestra-5(10),9(11)-dien-17β-ol

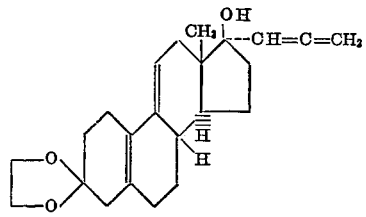

To a suspension of 2.75 g. of the methiodide of Step 2, in 50 ml. of tetrahydrofuran, there is added, at −75°, 9.3 ml. of a 0.525 molar lithium aluminum hydride- tetrahydrofuran solution. The mixture is brought to −10° where it is stirred until (~90 minutes) a clear solution is obtained. Finally, it is kept at room temperature for 12 hours. 100 ml. of 2 N aqueous NaOH solution containing 50 mg. ditert.-butylcresol is added and the mixture concentrated in vacuo until the total volume is 100 ml. Extraction with 5×20 ml. ether on the centrifuge, drying the ethereal solutions over $K_2CO_3$ and evaporation gives the title product, 3-ethylenedioxy-17α-propadienylestra-5(10),9(11)-dien-17β-ol.

STEP A

17α-propadienylestra-4,9-dien-17β-ol-3-one 3 g. of the product of Step 3, i.e., 3-ethylenedioxy-17α-propadienylestra-5(10),9(11)-dien - 17β - ol is dissolved in a mixture of 25 ml. of methanol and 0.8 ml. of 11 N aqueous hydrochloric acid and is kept at 30° C. for 30 minutes. After dilution with 50 ml. of water, the product is extracted with methylene chloride (5× 8 ml.). Evaporation of the dried methylene chloride solutions, followed by recrystallization of the residue from methanol yields the title compound, 17α-propadienylestra-4,9-17β-ol-3-one.

Following the procedure of this example but using in place of the 3-ethylenedioxyestra-5(10),9(11)-dien-17-one starting material an equivalent amount of
 (a) 13-ethyl-3-ethylenedioxygona - 5(10),9(11) - dien-17-one; or
 (b) 3-ethylenedioxy - 13 - n-propylgona-5(10),9(11)-dien-17-one, there is obtained:
 (a) 13-ethyl-17α-propadienylgona - 4,9 - dien-17β-ol-3-one; or
 (b) 17α-propadienyl - 13 - n-propylgona-4,9-dien-17β-ol-3-one.

EXAMPLE 24

17α-propadienylestra-4,9-dien-17β-ol-3-one

STEP A

17α-dimethylaminopropynyl-3-ethylenedioxyestra-5(10),9(11)-dien-17β-ol

To a solution of 2.5 g. of 3-ethylenedioxy-17α-ethynyl-estra-5(10),9(11)-dien-17β-ol in 25 ml. of dioxane, is added 2.5 ml. of dimethylamino methanol, 80 mg. of cuprous chloride and 1.4 ml. of glacial acetic acid. The stirred reaction mixture is then maintained at a temperature of 60 to 70° for 2½ hours and then cooled and diluted with ice/water containing sufficient sodium bicarbonate to insure that the solution remains basic. The organic material is extracted with methylene chloride and the solution so obtained dried over sulfate and evaporated. The residue is crystallized from acetone-petroleum ether (B.P. 60–90°); 1/1, to yield 17α-dimethylaminopropynyl - 3 - ethylenedioxyestra-5(10),9(11)-dien-17β-ol, M.P. 161–163°.

STEP 2

Methiodide salt

To a solution of 2.6 g. 17α-dimethylaminopropynyl-3-ethylenedioxyestra-5(10),9(11)-dien-17β-ol in 70 ml. of acetone is added 20 ml. of methyl iodide. The solution is kept at a temperature of 5° for 18 hours and then the solvent removed and the residue is crystallized from acetone to yield the product, i.e., the methiodide salt of 17α - dimethylaminopropynyl-3-ethylenedioxyestra-5(10),9(11)-dien-17β-ol, M.P. 229–230°.

STEP 3

3-ethylenedioxy-17α-propadienylestra-5(10),9(11)-dien-17β-ol

To a suspension of 3.2 g. of the methiodide salt (prepared in Step 2), in 100 ml. of anhydrous tetrahydrofuran under ice cooling is added dropwise 16 ml. of a 0.85 M solution of lithium aluminum hydride in tetrahydrofuran. The reaction mixture is allowed to warm to room temperature and stirred for a total of 1½ hours by which time solution is almost complete. Water is then added under cooling to decompose the excess hydride reagent, and on continued addition of water, a solid precipitates. This is isolated and dissolved in methylene dichloride. The organic solution is dried over sodium sulfate and evaporated to yield 3-ethylenedioxy-17α-propadienylestra-5(10),9(11)-dien-17β-ol.

STEP 4

17α-propadienylestra-4,9-dien-17β-ol-3-one

Using the product of Step 3, above and repeating the procedure described in Step 4 of Example 23 yields the title compound, 17α-propadienylestra-4,9-dien-17β-ol-3-one.

EXAMPLE 25

17α-dimethylaminopropynyl-3-ethylenedioxyestra-5(10),9(11)-dien-17β-ol

A total of 5.2 g. of lithium is added portionwise to 500 ml. of ethylenediamine stirred and maintained at a temperature of 50–60° under nitrogen. After the addition is complete, the resulting blue solution is heated to 95° for 1 hour when a pale yellow reaction mixture is obtained which is then cooled to 10° and 58 g. of dimethylaminopropyne is added dropwise over 5 minutes. Stirring is continued at room temperature for 1 hour, when a solution of 11 g. of 3-ethylenedioxyestra-5(10),9(11)-dien-17-one in 150 ml. of tetrahydrofuran is added. The mixture is now stirred at room temperature for 24 hours. After cooling (ice-water), 1000 ml. of saturated aqueous sodium chloride are added and the resulting organic layer is separated. After drying over sodium sulfate, the solvent is removed and the residue is crystallized from acetone/pet. ether, 1/1, to yield 17α-dimethylaminopropynyl-3-ethylenedioxyestra-5(10),9(11)-dien-17β-ol, M.P. 161–163°.

The thus-obtained intermediate compound may be utilized in the same manner as the product obtained in Step 1 of Example 24 to obtain 17α-propadienylestra-4,9-dien-17β-ol-3-one.

EXAMPLE 26

9α-methyl-17α-(propa-1′,2′-dienyl)-17β-hydroxy-estra-4-en-3-one

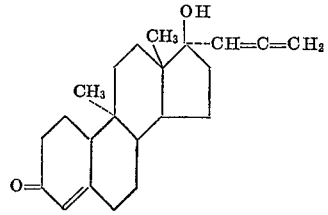

STEP A 17-ethylenedioxy-11β-hydroxy-3-methoxyestra-1,3,5(10)-triene

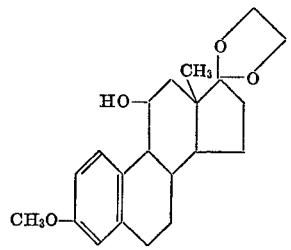

A mixture of 15 g. of 17-ethylenedioxyestra-1,3,5(10) trien-3,11β-diol and 30 g. of anhydrous potassium carbonate in 75 ml. of methanol and 60 ml. of methyl iodide is stirred and heated under reflux for 3 hours. The mixture is then cooled and diluted by the addition of 200 ml. of water. The methanol and methyl iodide are removed by distillation under reduced pressure and the aqueous residue is extracted twice with methylene chloride. The combined organic extracts are washed with saturated sodium chloride solution and dried over sodium sulfate. Removal of the solvent gives a residue which is crystallized from ether to yield 17-ethylenedioxy-11β-hydroxy-3-methoxyestra-1,3-5(10)-triene, M.P. 125–126° C.

STEP B 17-ethylenedioxy-3-methoxyestra-1,3,5(10)-triene-11-one

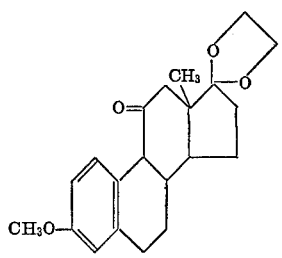

To a stirred solution of 5.13 g. of 17-ethylenedioxy-11β-hydroxy-3-methoxyestra-1,3,5(10)-triene in 25 ml. of dimethylsulfoxide and 25 ml. of benzene is added 3 ml. of pyridine and 9.3 g. of N,N-dicyclohexylcarbodiimide. This mixture is then cooled and 1.5 ml. of dichloroacetic acid is added. The whole next is stirred at room temperature for 1½ hours. It is diluted by the addition of 50 ml. of ether and a solution of 4 g. of oxalic acid in 10 ml. of methanol is added dropwise. The resulting suspension is stirred for 40 minutes at room temperature and filtered. The filtrate is concentrated to dryness and distributed between methylene chloride and a 10% aqueous solution of sodium bicarbonate. The organic phase is washed with water and dried ($Na_2SO_4$) before being evaporated to dryness under reduced pressure. The residue is placed on a column of silica-gel and eluted with chloroform containing various percentages of methanol. The fractions eluted with chloroform containing 5% of methanol are combined and evaporated to yield a residue which is crystallized from hexane/ether (1:1). Thus is obtained 17-ethylenedioxy - 3 - methoxyestra - 1,3,5(10) - trien-11-one, M.P. 122–123° C.

STEP C 17-ethylenedioxy-3-methoxy-9α-methylestra-1,3,5(10)-triene-11-one

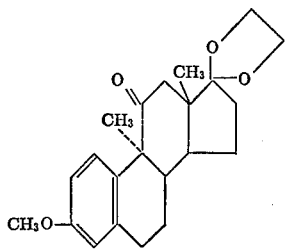

To a stirred, ice cooled solution of 10.5 g. of 17-ethylenedioxy-3-methoxyestra-1,3,5(10)-trien-11-one in 300 ml. of methyl iodide under an atmosphere of nitrogen is added, over 10 minutes, 120 ml. of a 1.1 molar solution of potassium tert.-butoxide in t-butyl alcohol. The temperature is allowed to rise to room temperature and the mixture is then stirred for 18 hours. It is next poured onto 500 ml. of water and extracted with methylene chloride, twice. The combined organic extracts are washed with water and dried over sodium sulfate. Removal of the solvent gives an oil which is crystallized from ether to yield 17 - ethylenedioxy-3-methoxy - 9α-methylestra-1,3,5(10)-trien-11-one, M.P. 142–145° C.

STEP D 17-ethylenedioxy-3-methoxy-9α-methylestra-1,3,5(10)-

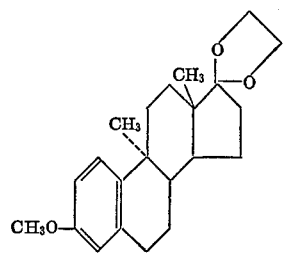

A mixture of 534 mg. of 17-ethylenedioxy-3-methoxy-9α-methylestra-1,3,5-(10)-trien-11-one, 1 g. of hydrazine dihydrochloride and 5 g. of hydrazine hydrate in 35 g. of triethyleneglycol is heated to a temperature of 130° and maintained there for 2½ hours. After this time, 1.8 g. of potassium hydroxide pellets is added and the temperature raised to 210°. This temperature is also maintained for 2½ hours whilst a mixture of hydrazine and water is slowly allowed to distill out. The reaction mixture is cooled and diluted with water affording a precipitate which is collected by filtration. The solid is dissolved in methylene chloride and the organic solution is dried over sodium sulfate. Removal of the solvent leaves a residue which is crystallized from hexane-ether to yield 17-ethylenedioxy-3-methoxy - 9α - methylestra - 1,3,5(10)-triene, M.P. 115° C.

STEP E

9α-methylestrone methyl ether

To a warm solution of 220 mg. of 17-ethylenedioxy-3-methoxy-9α-methylestra-1,3,5(10)triene in 5 ml. of methanol is added 1 ml. of 2 N hydrochloric acid solution and the mixture is heated under reflux for 5 minutes. On cooling, crystals are precipitated and these are isolated by filtration. The crystalline solid is washed with a small quantity of ether to yield 9α-methylestrone methyl ether, M.P. 190°–192° C.

STEP F

Preparation of 9α-methyl-estra-2,5(10)-dien-3,17-diol-3-methyl ether

A solution of 6.0 g. of 9α-methylestrone methyl ether in 90 ml. of tetrahydrofuran and 90 ml. of 1-butanol is added to 200 ml. of ammonia under reflux. A total of 2.8 g. of lithium is then added in portions over 10 min. and the resulting blue solution is stirred under reflux for 6 hrs. The ammonia is allowed to evaporate overnight and 50 ml. of methanol is added to the residue followed by 300 ml. of saturated aqueous sodium chloride and 200 ml. of benzene. The two phases are separated and the organic layer is washed with saturated aqueous sodium chloride, dried over anhydrous sodium sulphate and evaporated to give a residue which is crystallized from methanol. Thus is obtained 9α-methylestra-2,5(10)-dien-3,17-diol 3 methyl ether M.P. 116–120°.

STEP G

Preparation of 3-methoxy-9α-methylestra-2,5(10)-dien-17-one

A mixture of 5.0 g. of 9α-methylestra-2,5(10)-dien-3,17-diol-3-methyl ether and 4.5 g. of aluminum isopropoxide in 45 ml. of benzene and 45 ml. of 2-butanone is stirred and refluxed for 22 hrs., using a water separator. After cooling, the reaction mixture is added to 100 ml. of 2 N sodium hydroxide solution and a further 50 ml. of benzene are added. The organic layer is separated, washed with water and saturated sodium chloride and dried over anhydrous sodium sulphate. Removal of the solvent gives a residue which is crystallized from ether/hexane, 1/1 yielding 3-methoxy-9α-methylestra-2,5(10)-dien-17-one, M.P. 155–158°.

STEP H

Preparation of 17α-N,N-dimethylaminopropynyl-9α-methylestra-2,5(10)-dien-13,17β-diol-3-methyl ether A total of 2.2 g. of lithium is added portionwise to 150 ml. of ethylenediamine, stirred and maintained at a temperature of 50–60° under nitrogen. After the addition is complete the blue solution is heated to 75–85° for 1½ hrs. when a pale yellow reaction mixture is obtained. This is then cooled to 10° and 24 g. of N,N-dimethylamino-2-propyne is added over 5 min. Stirring is continued at room temperature for 1 hr., when a solution of 3.2 g. of 3-methoxy-9α-methylestra-2,5(10)-dien-17-one in 40 ml. of tetrahydrofuran is added. The mixture is now stirred at room temperature for 16 hrs. After cooling (ice/water) 200 ml. of saturated sodium chloride are added under nitrogen, followed by 300 ml. of benzene. The two layers are separated, the aqueous phase is extracted 3 times with benzene and the combined organic phases are washed with saturated sodium chloride before being dried over anhydrous sodium sulphate. After removal of the solvent there is obtained the product as an oil which is used in the subsequent step.

STEP I

Preparation of the quaternary ammonium salt

To a solution of 3.8 g. of 17α-N,N-dimethylaminopropynyl-9α-methylestra - 2,5(10) - dien - 3,17β - diol-3-methyl ether in 90 ml. of acetone is added 30 ml. of methyl iodide. The solution is kept at a temperature of 5° for 18 hrs. during which time a crystalline precipitate forms. This is filtered off and recrystallized from methanol/acetone, 1/5, to yield the product M.P. 240–243° (dec.).

STEP J

Preparation of 9α-methyl-17α-(propa-1′,2′-dienyl)-estra-2,5(10)-dien-3,17β-diol-2-methyl ether To a suspension of 3.3 g. of the above iodide salt in 100 ml. of anhydrous tetrahydrofuran, under ice cooling is added 10 ml. of a 70% solution of sodium di(methoxy-ethoxy) aluminum hydride in benzene diluted with 25 ml. of tetrahydrofuran. The reaction mixture is allowed to warm to room temperature and stirred for a total of 2 hrs. by which time solution is complete. Water is then added to decompose the excess hydride and the tetrahydrofuran is removed under reduced pressure. The aqueous residue is extracted with methylene chloride and the organic phase is dried over anhydrous sodium sulphate. After removal of the solvent there is obtained the product, 9α - methyl - 17α - (propa-1′,2′-dienyl)-estra-2,5(10)-dien-3,17β-diol-3-methyl ether as an oil sufficiently pure for use in the next step.

STEP K

Preparation of 9α-methyl-17α-(propa-1′,2′-dienyl)-17β-hydroxy-estra-4-en-3-one

To a solution of 600 mg. 9α-methyl-17α-(propa-1′,2′-dienyl)-estra-2,5(10)-dien-3,17β-diol-3-methyl ether in 10 ml. of methanol is added 5 drops of conc. hydrochloric acid and the mixture is left at room temperature for 1½ hrs. It is then diluted with ice/water and a saturated aqueous solution of sodium bicarbonate is slowly added until the mixture is no longer acidic. It is then extracted with ether and the organic solution is dried over anhydrous sodium sulphate. Removal of the solvent gives a residue which is crystallized from ether to yield 9α-methyl-17α-(propa - 1′,2′-dienyl)-17β-hydroxy-estra-4-en-3-one, M.P. 218–220°, which product is also alternately herein named 9α-methyl-17α-propadienylestra-4-en-17β-ol-3-one.

EXAMPLE 27

17β-hydroxy-11β-methyl-17α-propadienylestra-4-en-3-one

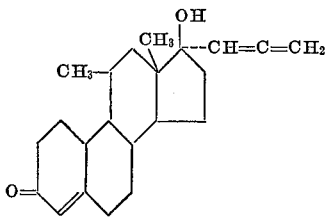

STEP A 3-methoxy-11β-methyl-17α-N,N-dimethylaminopropynylestra-2,5(10)-dien-17β-ol A total of 1.8 g. of lithium is added in small portions to 120 ml. of ethylenediamine with stirring at a temperature of 50°–60° under nitrogen. After addition is complete, the blue solution is heated at 75°–85° for 1½ hours whereat a pale yellow reaction mixture is obtained. This mixture is then cooled to 10°, and 20 g. of N,N-dimethylamino-2-propyne is added dropwise over 5 minutes. Stirring is continued at room temperature for 1 hour, at which point a solution of 2.6 g. of 3-methoxy-11β-methylestra-2,5(10)-dien-17-one in 40 ml. of tetrahydrofuran is added. The mixture is now stirred at room temperature for 4 hours; and after cooling in an ice-water mixture, 100 ml. of brine are added under nitrogen followed by 250 ml. of ether. The two layers are separated, and the aqueous layer is extracted 3 times with benzene. The combined organic phases are washed with brine and dried over sodium sulfate. After removal of the solvents, the residue is crystallized from ether to yield 3-methoxy-11β-methyl - 17α - N,N-dimethylaminopropynylestra-2,5(10)-dien-17β-ol (M.P. 170°–175°).

STEP B 3-methoxy-11β-methyl-17α-N,N-dimethylaminopropynylestra-2,5(10)-dien-17β-ol methiodide To a solution of 2.5 g. of 3-methoxy-11β-methyl-17α-N,N-dimethylaminopropynylestra-2,5(10) - dien - 17β-ol in 60 ml. of acetone is added 15 ml. of methyl iodide. The solution is kept at a temperature of 5° for 18 hours during which time a crystalline precipitate forms. This is filtered off and recrystallized from acetone to yield 3-methoxy-11β-methyl-17α-N,N - dimethylaminopropynylestra-2,5(10)-dien-17β-ol methiodide, M.P. 255°–260° (decomposition).

STEP C 3-methoxy-11β-methyl-17α-propadienylestra-2,5(10)-dien-17β-ol

To a suspension of 3.1 g. of the iodide salt from Step B in 100 ml. of anhydrous tetrahydrofuran, under ice cooling, is added 3 ml. of a 70% solution of sodium di(methoxyethoxy)aluminum hydride $$[NaAlH_2(OCH_2 \cdot CH_2 \cdot OCH_3)_2]$$

in benzene, diluted with 10 ml. of tetrahydrofuran. The reaction mixture is allowed to warm to room temperature and stirred for a total of 2 hours at which time solution is complete. Water is then added to decompose the excess hydride and the tetrahydrofuran is removed under reduced pressure. The aqueous residue is extracted with methylene chloride and the organic phase is dried over sodium sufate. After removal of the solvent, the residue is crystallized from ether/hexane (1:2) to yield 3-methoxy-11β-methyl-17α-propadienylestra - 2,5(10) - dien-17β-ol, M.P. 135°.

STEP D

17β-hydroxy-11β-methyl-17α-propadienylestra-5(10)-en-3-one

A suspension of 1 g. of 3-methoxy-11β-methyl-17α-propadienylestra-2,5(10)-dien-17β-diol in a mixture of 20 ml. of glacial acetic acid and 2.5 ml. of water is stirred at room temperature for 1½ hours at which time solution is complete. The solution is diluted with ice/water and saturated aqueous sodium bicarbonate is cautiously added until the mixture is no longer acidic. The mixture is then extracted with ether and the organic solution is dried over sodium sulfate. Evaporation of the ether yields a residue which is crystallized from ether/hexane (1:2) to give 17β-hydroxy-11β-methyl - 17α - propadienylestra-5(10)-en-3-one, M.P. 104°–105°.

When the procedure of Step D is repeated and the reaction is run for 6 hours instead of 1½ hours, the product obtained is 17β-hydroxy-11β-methyl-17α-propadienylestra-4-en-3-one.

STEP E

17β- hydroxy-11β-methyl-17α-propadienylestra-4-en-3-one

To a solution of 800 mg. of 3-methoxy-11β-methyl-17α-propadienylestra-2,5(10)dien -17β - ol in 10 ml. of methanol is added 5 drops of concentrated hydrochloric acid and the mixture is left at room temperature for 1½ hours. The mixture is then diluted with ice/water and a saturated aqueous solution of sodium bicarbonate is cautiously added until the mixture is no longer acidic. The solution is then extracted with ether, and the organic phase after separation is dried over sodium sulfate. Evaporation of the solvent yields a residue which is crystallized from ether/hexane (1:2), to give 17β-hydroxy-11β-methyl-17α-propadienylestra-4-en-3-one, M.P. 137°–139°.

STEP F

17β-hydroxy-11β-methyl-17α-propadienylestra-4-en-3-one (alternate method A)

Replacing the 3 - methoxy-11β-methyl-17α-propadienyl-estra-2,5(10)-dien-17β-ol in Step E by 17β-hydroxy-11β-methyl-17α-propadienyl-5(10) - en - 3 - one prepared by the procedure of Step D and following the procedure of Step E, there is obtained 17β-hydroxy-11β-methyl-17α-propadienylestra-4-en-3-one, M.P. 137°–139°.

STEP G

17β-hydroxy-11β-methyl-17α-propadienylestra-4-en-3-one (alternate method B)

To a solution of 1.0 g. of 17β-hydroxy-11β-methyl-17α-propadienylestra-5(10)-en-3-one prepared as described in Step D of this example in 10 ml. of methanol is added 10 ml. of aqueous 0.1 N potassium hydroxide and the resulting mixture is refluxed for 1 hour. Following this, the mixture is poured on water and the resulting precipitate is filtered, washed with water until neutral and then dried. Recrystallization from methylene dichloridediethyl ether yields 17β-hydroxy-11β-methyl - 17α - propadienylestra-4-en-3-one, M.P. 137°–139°.

Following the procedures of Steps A through D, but substituting 3-methoxy-13β-ethyl-11β-methylgono - 2,5(10)-dien-17-one for the 3-methoxy-11β-methylestra-2,5(10)-dien-17-one used in Step A, there is obtained 17β-hydroxy-13β-ethyl-11β-methyl-17α-propadienylgona - 5(10)-en-3-one.

When 17β - hydroxy-13β-ethyl-11β-methyl - 17α - propadienylgona-5(10)-en-3-one is used in place of 3-methoxy-11β-methyl - 17α - propadienylestra-2,5(10)-dien-17β-ol in the process of Step E, there is obtained 17β-hydroxy-13β-ethyl-11β-methyl - 17α - propadienylgona-4-en-3-one.

EXAMPLE 28

17α-propadienylestra-4,9-dien-17β-ol-3-one

STEP 1

Mixture of 17α-ethynylestra-4,9-dien-3α,17β and 3β,17β-diol 225 g. of 17α-ethynylestra-4,9-dien-17β-ol-3-one and 4.5 liters of dry methanol are charged to a vessel. 60 g. of sodium borohydride are added with stirring, at room temperature, portionwise over a period of 3 hours. Stirring is continued for an additional hour.

500 ml. of water are carefully added to the reaction mixture, the mixture concentrated under vacuum to 2 liters at 40° C., then poured into 4 liters of saturated aqueous sodium chloride and 4 liters of water. An oil containing the product separates, which oil is extracted with methylene chloride. The methylene chloride extracts are combined, washed with saturated aqueous sodium chloride, dried over anhydrous sodium sulfate, filtered and then concentrated to obtain a mixture of 17α-ethynylestra-4,9-diene-3α,17β-diol and 17α-ethynylestra-4,9-diene-3β,17β-diol as an oil.

STEP 2

17α-dimethylaminopropynylestra-4,9-dien-3α,17β-and-3β-17β-diol 236 g. of the mixture of 17α-ethynylestra-4,9-diene-3α,17β-and-3β,17β-diol (obtained in Step 1), 2.25 liters of p-dioxane, 225 ml. of dimethylaminomethanol, 3.75 g. of cuprous chloride and 135 ml. of glacial acetic acid are charged to a vessel, and the mixture stirred, at 50° C. for 1.5 hours. 1.3 liters of the p-dioxane are removed by distilling under vacuum at 50° C. The resulting concentrate is then poured into a mixture of 6 liters of saturated aqueous sodium chloride and 2 liters of water. A solution of 165 g. of anhydrous potassium carbonate in 1 liter of water is then added thereto. The resulting mixture is then extracted with methylene chloride. The combined methylene chloride extracts are then washed twice with saturated aqueous sodium chloride, dried over anhydrous sodium sulfate, then concentrated under vacuum to about 3 liters, treated with charcoal, filtered, and the filtrate evaporated to a syrup. Residual p-dioxane is then removed under high vacuum to obtain a mixture of 17α-dimethylaminopropynylestra - 4,9 - diene - 3α,17β - and - 3β,17β-diol as an oil for use in the next step (Step 3).

STEP 3

Methiodide salt 265 g. of a mixture of 17α-dimethylaminopropynyl-estra-4,9-diene-3α,17β-and-3β,17β-diol and 2.65 liters of acetone are charged to a vessel and 265 ml. of methyl iodide are added dropwise over a period of about ½ hour, with stirring, resulting in formation of crystals of methiodide salt. Stirring is continued for an hour after addition of the methyl iodide has been completed. The crystals of the product are recovered by filtration, washed with ice-cold acetone, the acetone solvent removed under vacuum to obtain the methiodide, which is used for the next reaction step (Step 4).

STEP 4

Mixture of 17α-propadienylestra-4,9-diene-3α,17β-and-3β,17β-diol 220 g. of the methiodide salt obtained in Step 3 and 6.6 liters of dry pyridine are charged to a vessel. 49 g. of lithium aluminum hydride is added portion-wise to the stirred mixture, at a rate such that the temperature of the mixture does not exceed about 50° C. The reaction mixture is then cooled to room temperature and 49 ml. of water, then 49 ml. of 15% aqueous sodium hydroxide solution, then 150 ml. of water are carefully added to the reaction mixture at a rate such that the temperature does not exceed 50° C. Solids are separated by filtration, then washed with pyridine. The filtrate and wash are combined and concentrated under vacuum to a syrup, which is then taken up in 1.5 liters of toluene. The toluene solvent is then removed by distilling under vacuum and the residue is then taken up in methylene chloride which is then washed with water, then saturated aqueous sodium chloride, dried over anhydrous sodium sulfate and filtered. The methylene chloride solution is then concentrated to a syrup which is then taken up in 2 liters of acetone (any insolubles being filtered off). The acetone solvent is then removed under vacuum to obtain the title product as an oil.

STEP 5

17α-propadienylestra-4,9-dien-17β-ol-3-one 138.3 g. of the mixture of 17α-propadienylestra-4,9-diene-3α,17β-and-3β,17β-diol obtained in Step 4, and 1380 ml. of p-dioxane are charged to a vessel. 125 g. of 2,3-dicyano-5,6-dichloro-benzoquinone in 690 ml. of p-dioxane is slowly added thereto, the temperature of the mixture being maintained at about 30°° C. After stirring for 1 hour at room temperature, 103.5 g. of anhydrous potassium carbonate and 44 g. of sodium dithionite in 1 liter of water is added while the temperature of the mixture is maintained at or below 30° C. The reaction mixture is then poured into 8 liters of saturated aqueous sodium chloride and extracted with ether. The ether extracts are combined, washed with saturated aqueous sodium chloride and then evaporated under high vacuum to obtain an oily residue. The residue is taken up in ether and the ether solution is passed through an aluminum oxide column to yield the product, i.e. 17α-propadienylestra-4,9-dien-17β-ol-3-one, M.P. 111–113° C.

What is claimed is:

1. A process for the production of a compound of the formula $$\begin{array}{c} OH \\ \overbrace{\phantom{xxxx}}^{p} R^1 \overbrace{\phantom{xxxx}}^{q} \!\!\!\!\!\! -CH=C=CH_2 \\ D \end{array}$$

in which $R^1$ is an alkyl radical having from 1 to 3 carbon atoms;

ring D is a 5 or 6 numbered ring and $\widetilde{p\ q}$ represents a steroidal residue
which comprises reducing with a complex hydride of the Formula A:

$$Y^{\oplus} - Z^1 - \overset{Z^2}{\underset{Z^3}{\overset{\|\ominus}{M}}} - H \qquad (A)$$

wherein
Y is an alkali or alkaline earth metal,
M is aluminum, gallium or boron;
each of $Z^1$, $Z^2$, and $Z^3$ is, independently, a hydrogen atom, alkyl having 1 to 6 carbon atoms, alkoxy having 1 to 6 carbon atoms or alkoxy-alkoxy having up to 6 carbon atoms; or
of the Formula B:

$$Z^5 - \overset{Z^4}{\underset{}{M}} - H \qquad (B)$$

wherein M is as defined above, and
each of $Z^4$ and $Z^5$ is independently, a hydrogen atom or alkyl having 1 to 6 carbon atoms; a corresponding hydroxy quaternary aminopropynyl substituted steroidal compound having the formula:

$$\begin{array}{c} OH \qquad\quad R^2 \\ \overbrace{\phantom{xxxx}}^{p} R^1 \overbrace{\phantom{xxxx}}^{q} \!\!\!\!\!\! -C\!\equiv\! C\!-\!CH_2\!-\!\overset{\oplus}{\underset{R^4}{N}}\!-\!R^3\ X^{\ominus} \\ D \end{array}$$

where
$R^1$, $\widetilde{p\ q}$ and Ring D are as defined above, $R^2$ represents alkyl having from 1 to 4 carbon atoms, and each of $R^3$ and $R^4$ is, independently, alkyl having from 1 to 4 carbon atoms; or cycloalkyl having 5- or 6-ring carbon atoms or $R^3$ and $R^4$ together with N represent a heterocyclic ring having from 5 to 7 members selected from the group consisting of pyrrolidino, piperidino, homopiperidino, morpholino, thiomorpholino, piperazino, and N-alkyl substituted piperazino wherein the alkyl has from 1 to 4 carbon atoms; and X is an anion derived from a mineral acid or an organic sulfonic acid provided that X is not fluoro.

2. The process of claim 1 wherein the complex hydride has the Formula A.

3. The process of claim 1 wherein the complex hydride has the Formula B.

4. The process of claim 2 wherein M is aluminum.

5. The process of claim 4 wherein the complex hydride is lithium aluminum hydride.

6. The process of claim 1 wherein X is chloride, bromide, iodide, methylsulfonate or p-toluene sulfonate.

7. The process of claim 1 wherein X is iodide.

8. The process of claim 1 wherein each of $R^2$, $R^3$ and $R^4$ is methyl.

9. The process of claim 1 wherein pyridine is a component of the reaction medium.

10. The process of claim 1 wherein each of $R^3$ and $R^4$ is, independently, alkyl having from 1 to 4 carbon atoms; or cycloalkyl having 5- to 6-ring carbon atoms or $R^3$ and $R^4$ together with N represent a heterocyclic ring having from 5 to 7 members selected from the group consisting of pyrrolidino, piperidino homopiperidino, and morpholino.

11. The process of claim 10 wherein the complex hydride has the Formula A.

12. The process of claim 11 wherein Ring D is a 5-membered ring.

13. The process of claim 12 wherein $\widetilde{p\ q}$ represents a residue of a 13-alkyl gonane.

14. The process of claim 13 wherein M is aluminum.

15. The process of claim 14 wherein the complex hydride is lithium aluminum hydride.

16. The process of claim 14 wherein the complex hydride is sodium dihydrobis (3-methoxyethoxy) aluminate.

17. The process of claim 14 for the production of 17α-propadienylestra-4-en-3β,17β-diol.

18. The process of claim 14 wherein X is chloride, bromide, iodide, methylsulfonate or p-toluene sulfonate.

19. The process of claim 18 wherein X is iodide.

20. The process of claim 19 wherein each of $R^2$, $R^3$ and $R^4$ is methyl.

21. The process of claim 14 for the production of 17α-propadienyl-3-methoxyestra-2,5(10)-dien-17β-ol.

22. The process of claim 14 for the production of 3-ethylenedioxy - 17α - propadienylestra-5(10),9(11)-dien-17β-ol.

References Cited

UNITED STATES PATENTS 3,503,959  3/1970  Christiansen _____ 260—239.5
3,682,985  8/1972  Basco et al. _____ 260—397.4

LEWIS GOTTS, Primary Examiner
E. G. LOVE, Assistant Examiner

U.S. Cl. X.R.

260—239.5, 397.4, 397.45, 397.5, 586 A, 617.5; 424—238, 241, 243